J. T. WORLEY.

Safety Passenger-Car.

No. 6,375. Reissued April 13, 1875.

WITNESSES
Granville Lewis
E. S. Karner.

By

INVENTOR
James T. Worley
Dues & Keesnit
Their Attorneys

THE GRAPHIC CO. PHOTO-LITH. 39 & 41 PARK PLACE, N.Y.

UNITED STATES PATENT OFFICE.

JAMES T. WORLEY, OF CLEVELAND, OHIO.

IMPROVEMENT IN SAFETY PASSENGER-CARS.

Specification forming part of Letters Patent No. 122,208, dated December 26, 1871; reissue No. 6,020, dated August 18, 1874; reissue No. 6,375, dated April 13, 1875; application filed March 23, 1875.

*To all whom it may concern:*

Be it known that I, JAMES T. WORLEY, of the city of Cleveland, in the county of Cuyahoga and State of Ohio, have invented certain new and useful Improvements in Safety-Cars for Railways; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
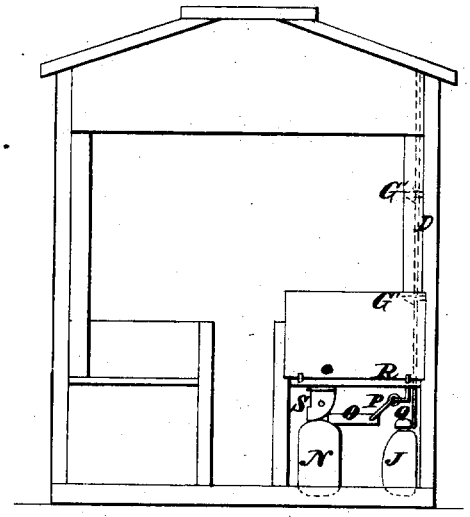
Figure 2:
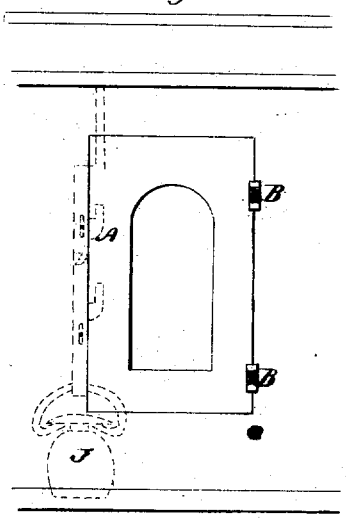
Figure 3:
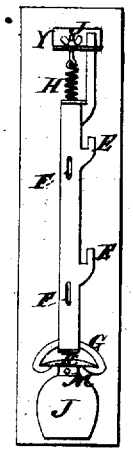

Figure 1 is a transverse section of a railway passenger-car provided with my invention. Fig. 2 is a side elevation of the same; and Fig. 3 is an elevation of the devices which in this example of my invention are employed to automatically release the safety door or windows.

Similar lettes of reference in the accompanying drawings indicate the same parts.

My invention has for its object to provide a railway passenger-car with the means of escape for passengers in case of accident. To this end it consists, primarily, in providing the car with door or windows which shall open automatically to afford a passage through the sides, ends, or roof when the car is accidentally thrown out of its proper position. The invention also consists in providing the car with doors or windows which shall open out automatically upon the upper side of the car when the latter is tipped or thrown over sidewise, so as to afford a ready exit for the passengers.

Having thus described the object of my invention and in what it consists, I will now set forth one means by which the same may be carried into effect.

In the accompanying drawings, A is a door or window attached to the side of the car by spring-hinges B, so as to open outward. D is an upright bolt or bar placed against the inner side wall of the car, opposite the swinging edge of the door, and adapted to slide vertically by the slots and bolts or screws F. A bracket, *y*, secured to the inside of the car, receives an arm formed upon or attached to the upper end of the bar, and serves to guide the latter in its vertical movements. The bar D moves downward against the tension of a spring, H, attached to its upper end, and connected by a swivel-bolt and nut, I, to the guide-bracket Y. E are recesses or slots formed in the bar D to receive the catches C, affixed to the swinging edge of the door for the purpose of holding the latter closed. The guide-slots F in the bar are of sufficient length to permit its vertical movement for locking and unlocking the catches. It is held engaged with the catches by means of the spring H. By operating the nut I the tension of the holding-spring H is adjusted to regulate the movement of the bar to release the catches. N is a weight pivoted to a bracket, S, upon the under side of the seat R, so as to swing transversely of the car. It is provided with a lateral arm, O, connected by a link, P, with the lower end of the locking-bar. When the car is tipped or thrown sidewise this weight operates to draw down the bar D, so as to release the catches and allow the door or window to be swung open upon that side of the car which is uppermost.

By this means a free exit is provided for the passengers, no matter upon which side the car is thrown. The swinging weight is represented as arranged under the seat R, but it may be applied to any part of the car which experience shall determine as most suitable. The number of doors or windows to be used is also a matter of choice. If desired an additional weight, J, may be employed to assist in drawing down the bar D, but I do not regard it as essential to the practicability of my invention. If used at all it is constructed with a cross-bar, K, upon its upper end, and is pivoted at M to the inside of the car-seat R. The cross-bar is attached to the lower end of the sliding-bar by means of a loop, G, so that when the weight swings from side to side it shall pull down the bar and release the catches.

Having thus described my invention, what I claim as new is—

1. In combination with a railroad-car, mechanism to open the doors or windows therein automatically, when the car is thrown out of its proper position, for the purpose specified.

2. In combination with a railroad-car, mechanism to open the doors or windows therein automatically upon the upper side of the car, when the latter is thrown or tipped over, for the purpose specified.

3. In combination with a railroad-car a weight adapted to open the doors or windows automatically, when the car is thrown out of its proper position, for the purpose specified.

JAMES T. WORLEY.

Witnesses:
F. W. GREEN,
JAMES WADE, Jr.